United States Patent
Murdock et al.

(10) Patent No.: US 11,049,309 B2
(45) Date of Patent: Jun. 29, 2021

(54) MOTION TRACKING AND IMAGE RECOGNITION OF HAND GESTURES TO ANIMATE A DIGITAL PUPPET, SYNCHRONIZED WITH RECORDED AUDIO

(71) Applicant: Disney Enterprises, Inc., Burbank, CA (US)

(72) Inventors: Malcolm Murdock, Los Angeles, CA (US); Michael Hy, Los Angeles, CA (US); Armen Mkrtchyan, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1137 days.

(21) Appl. No.: 14/099,691

(22) Filed: Dec. 6, 2013

(65) Prior Publication Data
US 2015/0161809 A1 Jun. 11, 2015

(51) Int. Cl.
*G06T 13/00* (2011.01)
*G06T 13/40* (2011.01)
*G06F 3/03* (2006.01)
*G06F 3/01* (2006.01)
*G10L 21/10* (2013.01)

(52) U.S. Cl.
CPC ............ *G06T 13/40* (2013.01); *G06F 3/011* (2013.01); *G06F 3/0304* (2013.01); *G10L 2021/105* (2013.01)

(58) Field of Classification Search
None
See application file for complete search history.

(56) References Cited

U.S. PATENT DOCUMENTS

| 7,468,728 | B2 * | 12/2008 | Watt | A63F 13/10 345/473 |
|---|---|---|---|---|
| 2002/0135581 | A1 * | 9/2002 | Russell | G06T 7/0081 345/474 |
| 2005/0151850 | A1 * | 7/2005 | Ahn | G06F 3/017 348/207.99 |
| 2008/0195942 | A1 * | 8/2008 | Marsyla | G06F 9/4443 715/704 |
| 2010/0042411 | A1 * | 2/2010 | Addessi | G10L 13/00 704/270 |

(Continued)

OTHER PUBLICATIONS

Liikkanen et al. "Exploring Emotions and Multimodality in Digitally Augmented Puppeteering", AVI'08, May 28-30, 2008, Napoli, Italy.*

(Continued)

*Primary Examiner* — Saptarshi Mazumder
(74) *Attorney, Agent, or Firm* — Farjami & Farjami LLP

(57) ABSTRACT

There is provided a system and method for creating a digital puppet show by animating a digital puppet using gestures and sound. The method includes presenting the digital puppet to a user on a display. The method further includes receiving motion data corresponding to a gesture, using a camera, from the user, translating the motion data into digital data using a motion tracking algorithm, and animating the digital puppet, on the display, using the digital data. The method can further include receiving audio data from the user using a microphone and playing the audio data, using a speaker, while animating the digital puppet on the display to create the digital puppet show.

18 Claims, 6 Drawing Sheets

(56) References Cited

U.S. PATENT DOCUMENTS

| | | | | |
|---|---|---|---|---|
| 2010/0070859 A1* | 3/2010 | Shuster | ............... | A63F 13/358 |
| | | | | 715/706 |
| 2012/0013621 A1* | 1/2012 | Ospina Gonzalez | ... | G06T 13/80 |
| | | | | 345/473 |
| 2013/0030815 A1* | 1/2013 | Madhvanath | ........... | G06F 3/038 |
| | | | | 704/275 |
| 2013/0100140 A1* | 4/2013 | Ye | ........................ | G06T 13/20 |
| | | | | 345/473 |
| 2014/0028712 A1* | 1/2014 | Keating | ............... | G06T 19/006 |
| | | | | 345/633 |
| 2014/0298212 A1* | 10/2014 | Wen | .................. | G06F 3/04847 |
| | | | | 715/762 |

OTHER PUBLICATIONS

Fatland et al. "The puppet ui: Tools for nonverbal communication in virtual environments," 2007. [Online]. Available: http://www.efatland.com/portfolio/puppetUI/PuppetUIpaper.pdf.*

\* cited by examiner

Gesture 372A

Digital Puppet 318A

Gesture 372B

Digital Puppet 318B

MOTION TRACKING AND IMAGE RECOGNITION OF HAND GESTURES TO ANIMATE A DIGITAL PUPPET, SYNCHRONIZED WITH RECORDED AUDIO

BACKGROUND

Real life puppet shows are a popular source of entertainment for children and can be performed by placing a sock over a person's hand to impersonate a character. Puppet shows give children the ability to dress socks up to look like their favorite characters, and using their fingers and thumb, children are able to move the mouth of the sock character while giving a narrative in order to create the puppet show. However, this form of entertainment has started to become less popular for children, who are now looking to the digital world for new forms of entertainment.

Interactive digital storybook applications for phones and computers are also very popular with children and allow children to create puppet shows using their favorite characters. Children are able to create and record puppet shows by moving 2-D cutouts of their favorite characters around a scene, while at the same time narrating the characters to give the characters a voice. When a child is finished recording the puppet show, the child can playback the puppet show to entertain friends and family. This gives children the experience of creating their very own animated story. However, these interactive digital storybook applications can be very limited by their simplicity in that they only allow children to move 2-D characters around a scene while narrating the puppet show. As such, any gestures made by the children, like sock puppets in the physical space, have no impact on the animation of the characters in the puppet show.

SUMMARY

The present disclosure is directed to the animation of a digital puppet on a device using hand gestures synchronized with recorded audio, substantially as shown in and/or described in connection with at least one of the figures, as set forth more completely in the claims.

DETAILED DESCRIPTION

Figure 1:
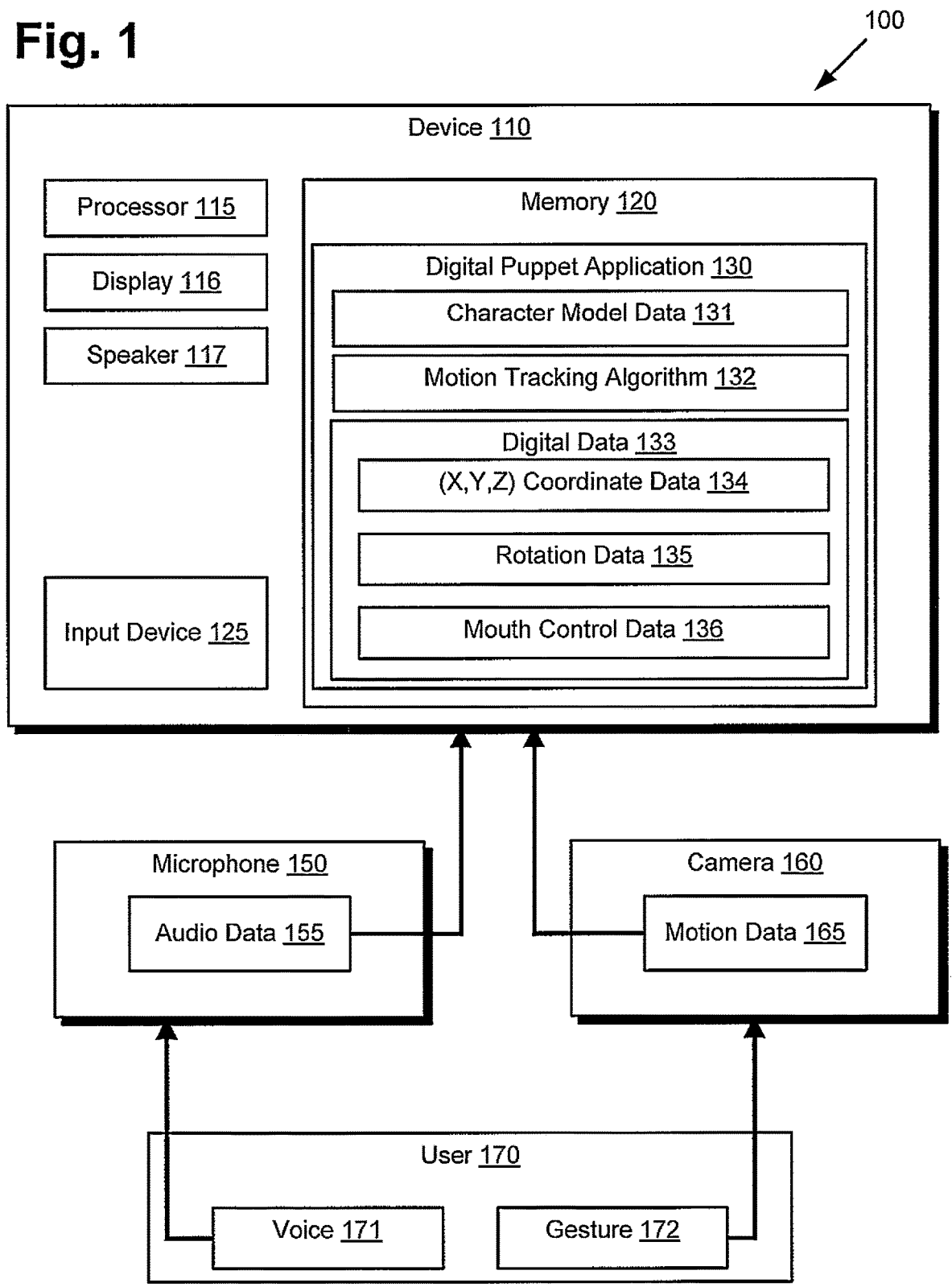
FIG. 1 presents a system for creating a digital puppet show using a device, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for creating a digital puppet show using a device, according to one implementation of the present disclosure. FIG. 1 includes device 110, microphone 150, camera 160, and user 170. Device 110 includes processor 115, display 116, speaker 117, memory 120, and input device 125. Memory 120 includes digital puppet application 120, which includes character model data 131, motion tracking algorithm 132, and digital data 133. Digital data 133 includes (X,Y,Z) coordinate data 134, rotation data 135, and mouth control data 136. Microphone 150 includes audio data 155. Camera 160 includes motion data 165. User 170 includes voice 171 and gesture 172.

Device 110 may comprise a personal computer, a mobile phone, a tablet, a video game console, or any other device capable of executing digital puppet application 130 in memory 120. As shown in FIG. 1, device 110 includes display 116, speaker 117, and input device 125. Input device 125 may comprise, for example, a keyboard, a mouse, a game controller, a touch-screen input, a thermal and/or electrical sensor, or any other device capable of accepting user input for use with device 110. Display 116 may comprise a liquid crystal display (LCD) screen built into device 110. In alternative implementations of the present disclosure, display 116 may be another type of display hardware, such as cathode-ray tubes (CRT) monitors. In yet other implementations, display 116 may also be touch sensitive and may serve as input device 125. Moreover, display 116, speaker 117, and input device 125 may be externally attached to device 110 through physical or wireless connection.

Device 110 further includes processor 115 and memory 120. Processor 115 may be configured to access memory 120 to store received input or to execute commands, processes, or programs stored in memory 120, such as digital puppet application 130. Processor 115 may correspond to a processing device, such as a microprocessor or similar hardware processing device, or a plurality of hardware devices. However, in other implementations processor 115 refers to a general processor capable of performing the functions required of device 110. Memory 120 is capable of storing commands, processes, and programs for execution by processor 115. Memory 120 may be instituted as ROM, RAM, flash memory, or any sufficient memory capable of storing a set of commands. In other implementations, memory 120 may correspond to a plurality memory types or modules. Memory 120 may also be protected to prevent outside manipulation of memory 120 or specific portions of memory 120.

The following implementations are directed towards the animation of a digital puppet on device 110. However, the present disclosure is not just limited to animating a digital puppet on device 110. In one implementation, the present disclosure can be used to control players in video games. Still in other implementations, the present disclosure can be used for any application that can be executed using motion tracking on the gestures of the user.

According to the implementation of FIG. 1, camera 160 captures gesture 172 from user 170 as motion data 165. Gesture 172 can include any body movement from user 170 that is used to animate a digital puppet, such as, but not limited to, hand gestures or full body gestures. Camera 160 then transmits motion data 165 to device 110 for processing. In other implementations, camera 160 may not be separate from device 110 and may be physically attached or built into device 110. In such implementations, processor 115 of device 110 directs camera 160 to capture gesture 172 from user 170.

It should be noted that the implementation of FIG. 1 only includes one user 170 making one gesture 172, however, the implementation of FIG. 1 is not limited to only one user 170 and one gesture 172. In other implementations, user 170 may make more than one gesture. For example, user 170 may use both his right hand and his left hand to make gestures. In such an example, as will be discussed below with moving a digital puppet, camera 160 can capture both a gesture made by the right hand of the user and a gesture made by the left hand of the user. As such, the user can create his digital puppet show using two separate puppets. Still, in other implementations, there may be more than just one user making gestures. For example, camera 160 can capture gestures made by more than one person and each person can control his or her own digital puppet with the captured gestures. In such an example, a group of users together can create a puppet show with multiple digital puppets.

Once motion data 165 is received by device 110, processor 115 of device 110 can access digital puppet application 130 stored in memory 120. Processor 115 can then execute motion tracking algorithm 132 to translate motion data 165 into digital data 133. Processor 115 of device 110 can then output digital data 133 to animate a digital puppet on display 116, as described in more detail with regard to FIG. 2.

As illustrated in FIG. 1, digital data 133 includes (X,Y,Z) coordinate data 134, rotation data 135, and mouth control data 136. (X,Y,Z) coordinate data 134 gives the position coordinates for the digital puppet on display 116. For example, (X,Y,Z) coordinate data 134 might cause the digital puppet to be displayed on the left, middle, or right of display 116. Furthermore, (X,Y,Z) coordinate data 134 might cause the digital puppet to be displayed as a close up on display 116, or display the digital puppet so that the digital puppet looks far away on display 116. However, the examples described above are not limiting and (X,Y,Z) coordinate data 134 can cause the digital puppet to be displayed anywhere on display 116 using 3-D coordinates.

Rotation data 135 is used to give the orientation of the digital puppet on display 116. For example, if user 170 is using hand gestures to animate the digital puppet on display 116 and user 170 turns his or her hand to the left, the head of the digital puppet displayed on display 116 will turn to the left to match the rotation of gesture 172 made by user 170. For another example, if user 170 repeatedly makes the gesture of up and down rotations with his or her hand in front of camera 160, the head of the digital puppet on display 116 will repeatedly rotate up and down to follow the gesture of user 170. However, the implementations described above are not limiting and the digital puppet displayed on display 116 can be rotated to match any orientation of gesture 172 being performed by user 170.

Mouth control data 136 is used to control the mouth of the digital puppet being animated on display 116. For example, and sticking with user 170 making hand gestures in front of camera 160, the fingers and thumb of user 170 can operate as the mouth of the digital puppet. As such, if user 170 closes his or her hand so that all four fingers and the thumb meet at one point, the mouth of the digital puppet would be displayed in a closed position. Next, if user 170 opens his or her hand so that the four fingers and thumb are separated from each other, the mouth of the digital puppet will be displayed in the open position, so as to match gesture 172 being performed by user 170. This type of mouth control will be more clearly described below, with reference to FIGS. 3A-3C.

Digital puppet application 130 also includes character model data 131. Character model data 131 includes 3-D model data for each of the various digital puppets from which user 170 can select to create a 3-D digital puppet show. For example, if user 170 wants to create a Cinderella puppet show, character model data 131 will include 3-D model data for the different characters of Cinderella. Such digital puppets could include Cinderella, the Fairy Godmother, and Prince Charming. User 170 is then able to view the characters of Cinderella and select a digital puppet of choice using input device 125. However, the present disclosure is not limited to just Cinderella characters. In other implementations, character model data 131 includes 3-D model data for any character user 170 wishes to animate.

The system of FIG. 1 further includes microphone 150. Microphone 150 records voice 171 of user 170 as audio data 155 in real time. Voice 171 can include a spoken word or a series of spoken words that make full sentences. Also, voice 171 does not have to be spoken using English words, and can be spoken in any language native to user 170. Furthermore, voice 171 does not have to include actual words, but can include any type of sound made by user 170. Once microphone 150 captures audio data 155 from user 170, microphone 150 transmits audio data 155 to device 110. In other implementations, microphone 150 may not be separate from device 110 and may be physically attached or built into device 110. In such implementations, processor 115 of device 110 directs microphone 115 to record voice 171 of user 170.

Once audio data 155 is received by device 110, device 110 plays audio data 155 using speaker 117 while at the same time animating the digital puppet on display 116. In one implementation, audio data 155 may be time marked to match the animations of the digital puppet, so as to better synchronize the audio with the animation of the digital puppet. By synchronizing audio data 155 with the animation of the digital puppet on display 116, user 170 has used device 110 to create a 3-D digital puppet show. Furthermore, in other implementations as described in more detail with reference to FIG. 2 below, user 170 may be able to record the 3-D digital puppet show for playback at a later time, such as to show friends or family. This provides user 170 with to ability to create a 3-D animated puppet show using his or her selected digital puppet.

Figure 2:
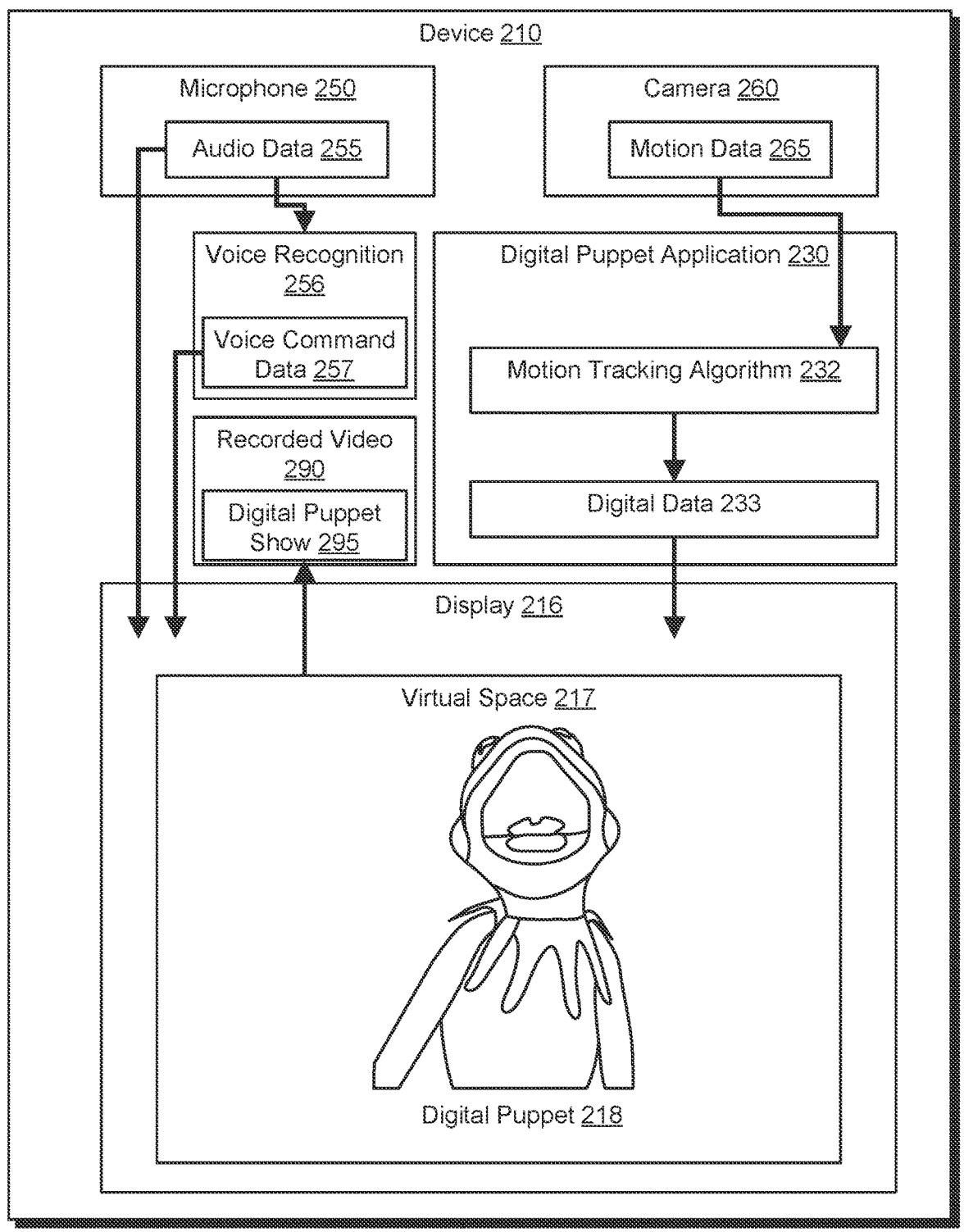
FIG. 2 presents a device that includes a display for creating a digital puppet show, according to one implementation of the present disclosure.

FIG. 2 presents a device that includes a display for creating a digital puppet show, according to one implementation of the present disclosure. FIG. 2 includes device 210. Device 210 includes display 216, digital puppet application 230, microphone 250, voice recognition 256, camera 260, and recorded video 290. Display 216 includes virtual space 217, which includes digital puppet 218. Digital puppet application 230 includes motion tracking algorithm 232 and digital data 233. Microphone 250 includes audio data 255. Camera 260 includes motion data 265. Recorded video 290 includes digital puppet show 295.

With regards to FIG. 2, it should be noted that device 210, display 216, digital puppet application 230, microphone 250, and camera 260 correspond respectively to device 110, display 116, digital puppet application 130, microphone 150, and camera 160 from FIG. 1. Furthermore, motion tracking algorithm 232 and digital data 233 correspond respectively to motion tracking algorithm 132 and digital data 133 from FIG. 1. Additionally, elements such as processor, memory, speaker, input device, (X,Y,Z) coordinate data, rotation data, mouth control data, and character model data have been removed from FIG. 2 for clarity purposes.

As illustrated in FIG. 2, display 216 includes digital puppet 218 in virtual space 217. Virtual space 217 may include a background selected by a user of digital puppet 218, which can be customized by the user to fit the type of puppet show that the user is trying to create. For example, if the user is trying to create a puppet show using a Cinderella puppet, the user can select a palace as virtual space 217 so that Cinderella is being animated with a palace background. Furthermore, virtual space 217 can also be chosen by the user to be three-dimensional. For example, and sticking with the example of the user animating Cinderella in front of a palace, the user may choose to animate Cinderella in front of a three-dimensional palace background. This gives the user the ability to customize the background of the puppet show, creating more excitement for the user.

As shown in the implementation of FIG. 2, microphone 250 and camera 260 are both physically built into device 210. As such, a processor of device 210, such as processor 115 of FIG. 1, can activate microphone 250 to record audio data 255 and activate camera 260 to capture gestures of a user as motion data 265. However, as discussed above with reference to FIG. 1, in other implementations, both microphone 250 and camera 260 may be separate from device 210. In those implementations, both microphone 250 and camera 260 may be externally connected to device 210 by a physical or wireless connection.

FIG. 2 illustrates camera 260 that includes motion data 265. As discussed in FIG. 1, camera 260 captures gestures from a user as motion data 265. These gestures can include full body gestures of the user or just hand gestures of the user. After motion data 265 has been captured by camera 260, motion data 265 is transmitted to motion tracking algorithm 232 of digital puppet application 230. Motion tracking algorithm 232 then translates motion data 265 into digital data 233. As previously discussed with reference to FIG. 1, digital data 233 may include (X,Y,Z) coordinate data 134, rotation data 135, and mouth control data 136. After motion tracking algorithm 232 has finished translating motion data 265 to digital data 233, digital data 233 is output to display 216 to animate digital puppet 218 being displayed in virtual space 217.

FIG. 2 further illustrates microphone 250. As discussed in FIG. 1, microphone 250 records the voice of the user or sounds made by the user as audio data 255. Audio data 255 can then be transmitted from microphone 250 and combined with the animation of digital puppet 218 in virtual space 217 of display 216. Audio data 255 is then played on a speaker of device 210 and synchronized with the animation of digital puppet 218. In one implementation, as discussed above, audio data 255 is time marked to better synchronize the audio with the animation of digital puppet 218. By synchronizing the audio with the animation of digital puppet 218, the user is given the experience of creating his or her own 3-D digital puppet show, where digital puppet 218 is animated with the gestures of the user while at the same time speaking with the voice of the user.

Also illustrated in FIG. 2 is voice recognition 256. After microphone 250 records the voice of the user as audio data 255, audio data 255 is further transmitted to voice recognition 256. Voice recognition 256 can then search for command words in audio data 255 and translate the command words into voice command data 257. Voice command data 257 can then be output on the display to animate digital puppet 218, in a similar fashion as digital data 233. For example, such command words might include "smile" or "frown." If voice recognition 256 recognizes either the word "smile" or "frown" from audio data 255, voice recognition 256 can translate "smile" or "frown" into voice command data 257 to be used to animate digital puppet 218. As such, if the user of device 210 says the word "smile," this will cause digital puppet 218 to smile in virtual space 217. Furthermore, if the user says the word "frown," this will cause digital puppet 218 to frown in virtual space 217, thus, giving the user more control of digital puppet 218 in virtual space 217. However, it is noted that the command words for voice recognition 256 are not just limited to "smile" and "frown." In other implementations, the user can use any number of action words to control the facial expressions of digital puppet 218. Furthermore, command words may also include words that animate more then just the facial expressions of digital puppet 218. For example, command words might control the body movements of digital puppet 218, such as to make digital puppet 218 "raise both arms" or "turn to a new direction."

Further illustrated in FIG. 2 is recorded video 290. Recorded video 290 can record the animation of digital puppet 218 in virtual space 217 along with audio data 255, and save it as digital puppet show 295 in the memory of device 210, such as memory 120 of FIG. 1. In this way, the user is able to record digital puppet show 295 for playback at a later time, such as to show family and friends. This gives the user the ability to create a 3-D animated puppet show using digital puppets.

Figure 3A:
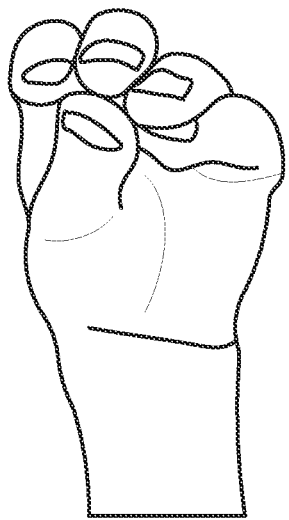
FIG. 3A presents a first example of a hand gesture for animating a digital puppet, according to one implementation of the present disclosure.
Figure 3A:
Figure 3B:
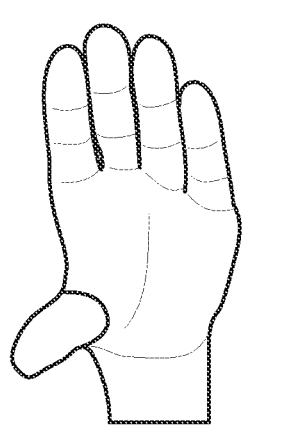
FIG. 3B presents a second example of a hand gesture for animating a digital puppet, according to one implementation of the present disclosure.
Figure 3B:
Figure 3C:
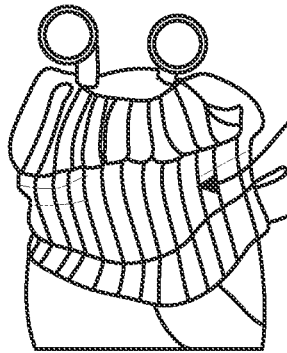
FIG. 3C presents an example of using a physical accessory with a hand gesture for animating a digital puppet, according to one implementation of the present disclosure.
Figure 3C:
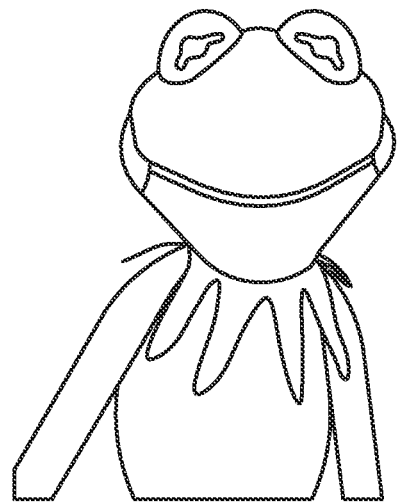

FIGS. 3A-3C present examples of using hand gestures to animate a digital puppet on a device, according to one implementation of the present disclosure. As illustrated in FIGS. 3A-3C, the user is using his or her hand to make gestures to animate the digital puppet. As such, the hand of the user corresponds to the head of the digital puppet, with the fingers and thumb corresponding to the mouth of the digital puppet. However, as discussed above, the user is not limited to only using hand gestures to animate the digital puppet.

Moving to FIG. 3A, FIG. 3A presents a first example of a hand gesture for animating a digital puppet, according to one implementation of the present disclosure. FIG. 3A includes gesture 372A and digital puppet 318A. With regards to FIG. 1 and FIG. 2, it should be noted that gesture 372A corresponds to gesture 172 of FIG. 1, and digital puppet 318A corresponds to digital puppet 218 of FIG. 2.

As illustrated in FIG. 3A, gesture 372A includes the user pinching his or her four fingers and thumb in a closed position, so that the fingers and thumb come together at a point. This gesture corresponds to animating digital puppet 318A with a closed mouth. Furthermore, as illustrated in FIG. 3A, the hand of the user would be pointed straight at the camera. Thus, digital puppet 318A would be animated looking directly at the user in the display, such as display 116 from FIG. 1 or display 216 from FIG. 2.

Moving to FIG. 3B, FIG. 3B presents a second example of a hand gesture for animating a digital puppet, according to one implementation of the present disclosure. FIG. 3B includes gesture 372B and digital puppet 318B. With regards to FIG. 1 and FIG. 2, it should be noted that gesture 372B corresponds to gesture 172 of FIG. 1, and digital puppet 318B corresponds to digital puppet 218 of FIG. 2.

As illustrated in FIG. 3B, the user has now making gesture 372B by opening up his or her hand, so that the fingers and the thumb are separated from each other. Gesture 372B causes digital puppet 318B to be animated with an open mouth, so that digital puppet 318B matches gesture 372B. Furthermore, in one implementation, digital puppet 318B will match gesture 372B using degrees of how far the hand is open or close. For example, if the user only opens his or her hand a little bit, so that the fingers are close to the thumb, then the mouth of digital puppet 318B will also only open a little bit to match the close separation of the fingers and thumb. However, if the user opens his or her hand wider, so that the fingers get further apart from the thumb, then the mouth of digital puppet 318B will continue to further open, so as to match the greater separation of the fingers and thumb.

Moving to FIG. 3C, FIG. 3C presents an example of using a physical accessory with a hand gesture for animating a digital puppet, according to one implementation of the present disclosure. FIG. 3C includes gesture 372C and digital puppet 318C. Gesture 372C includes physical accessory 373. With regards to FIG. 1 and FIG. 2, it should be noted that gesture 372C corresponds to gesture 172 of FIG. 1, and digital puppet 318C corresponds to digital puppet 218 of FIG. 2.

As illustrated in FIG. 3C, gesture 372C includes the user having his or her hand in the closed position, as was previously shown in FIG. 3A. However, FIG. 3C illustrates the user using physical accessory 373 to make gesture 372C. Physical accessory 373 in FIG. 3C is a hand puppet that the user can place over his or her hand. Furthermore, physical accessory 373 is made to resemble digital puppet 318C, which is a frog in the example illustrated in FIG. 3C. However, it is noted that physical accessory 373 is not limited to just a hand accessory that looks like a frog. In other implementations, the physical accessory can be made to resemble any digital puppet that the user wishes to animate. Furthermore, the physical accessory is not just limited to hand puppets, but can also include other accessories, such as toys, clothing, or any other physical accessory that a camera can capture to create motion data.

In one implementation, physical accessory 373 can be a hand puppet that the user purchases in order to animate digital puppet 318C. In this way, the user can purchase different hand puppets corresponding to different digital puppets. When the user purchases one of these hand puppets, the digital puppet corresponding to the purchased hand puppet can be unlocked, giving the user the ability to animate the newly unlocked digital puppet on a device. For example, if the user wants to create a 3-D animation puppet show using a Cinderella digital puppet, the user would have to purchase the Cinderella hand puppet in order to unlock the Cinderella digital puppet. However, in other implementations, the hand puppet could be a general hand puppet that is used to animate any digital puppet selected by the user. In such implementations, the user would not have to purchase the hand puppet corresponding to the digital puppet in order to unlock the digital puppet.

Physical accessory 373 may further include digital markers. The digital markers may be used to assist the motion tracking algorithm to track the gestures of the user. This can be accomplished by placing any number of digital markers on physical accessory 373, which are then captured by the camera and used to assist the motion tracking algorithm in translating motion data into digital data. In this way, the animation of digital puppet 318C can more closely match gestures made by the user. However, physical accessory 373 does not have to include the digital markers and can just be a fun accessory for the user to utilize while animating digital puppet 318C.

Figure 4:
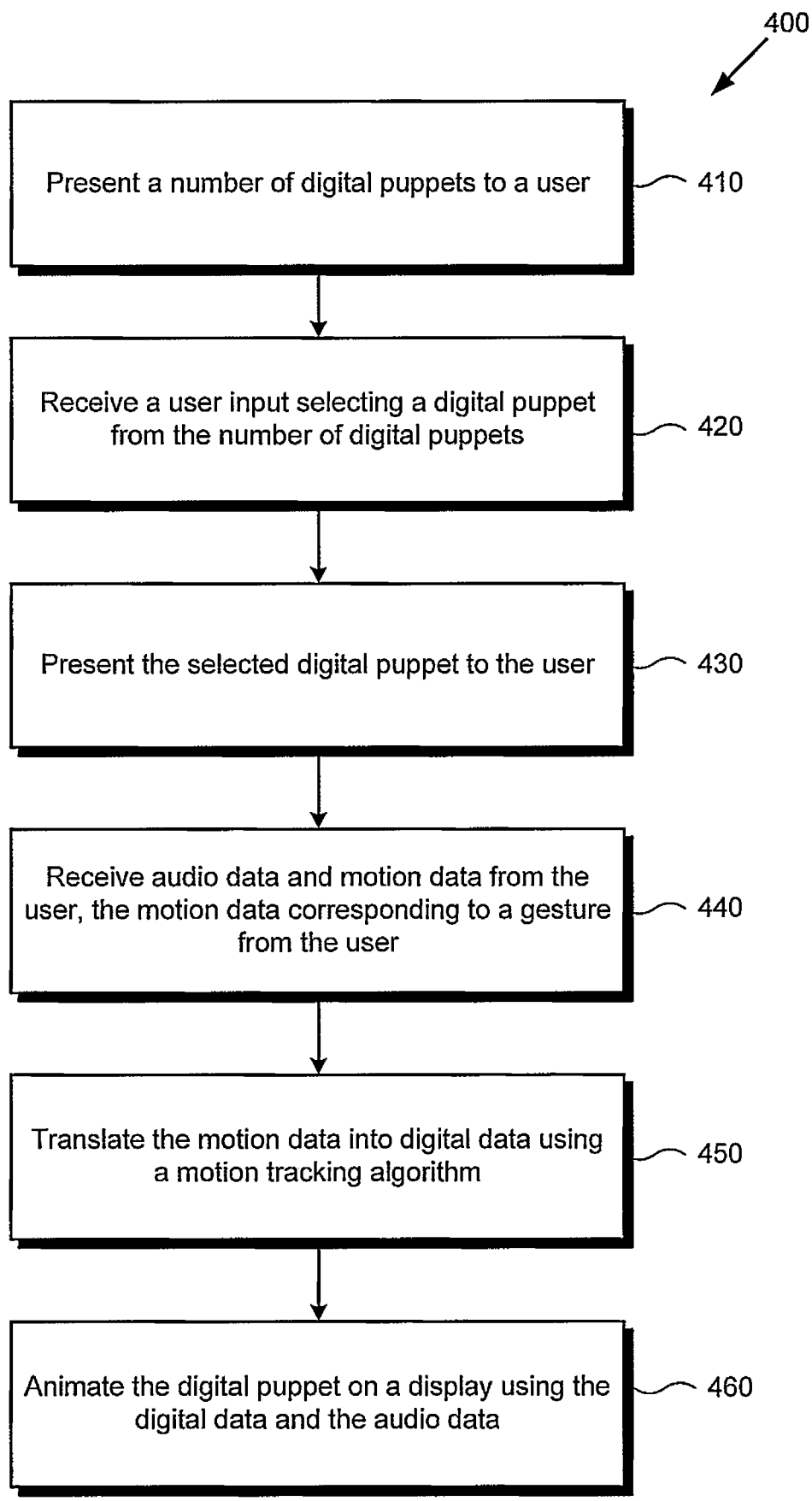
FIG. 4 shows a flowchart illustrating a method for creating a digital puppet show, according to one implementation of the present disclosure.

FIG. 4 shows a flowchart illustrating a method for creating a digital puppet show, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIGS. 1 and 2, the disclosed inventive concepts are not intended to be limited by specific features shown and described with respect to FIGS. 1 and 2. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 includes presenting a number of digital puppets to a user (410). For example, processor 115 of device 110/210 can execute character model data 131 of digital puppet application 130/230 stored in memory 120. Character model data 131 includes several different digital puppets corresponding to different characters for which the user 170 can select from. Processor 115 can then present the different digital puppets to user 170 on display 116/216. In one implementation, display 116/216 might display all of the digital puppets to user 170 at the same time. In other implementations, display 116/216 might only display one digital puppet to user 170 and user 170 might use input device 125 to scroll through the different digital puppets.

Flowchart 400 also includes receiving a user input selecting a digital puppet from the number of digital puppets (420). For example, user 170 can use input device 125 of device 110/210 to select a digital puppet from the number of digital puppets presented to user 170 on display 116/216, such as digital puppet 218. Furthermore, in one implementation, user 170 may select more than one digital puppet from the number of digital puppets.

Flowchart 400 also includes presenting the selected digital puppet to the user (430). For example, user 170 might have selected digital puppet 218 from the number of digital puppets. Processor 115 may then present digital puppet 218 on display 116/216 for user 170. In the implementations where user 170 selects more than one digital puppet, processor 115 might present all of the selected digital puppets to user 170 on display 116/216.

Flowchart 400 also includes receiving audio data and motion data from the user, the motion data corresponding to a gesture from the user (440). For example, processor 115 may activate microphone 150/250 to record audio data 1551255 corresponding to voice 171 of user 170. As discussed above, voice 171 may be spoken words from user 170 or sounds made by user 170. Processor 115 may also activate camera 160/260 to capture motion data 165/265 corresponding to gesture 172 of user 170. Gesture 172 may include full body movement by user 170 or simply hand gestures made by user 170. In one implementation as discussed above with reference to FIG. 3C, user 170 may perform gesture 372C using physical accessory 373.

Flowchart 400 also includes translating the motion data into digital data using a motion tracking algorithm (450). For example, processor 115 can execute motion tracking algorithm 132/232 of digital puppet application 130/230 to translate motion data 165/265 into digital data 133/233. In one implementation, digital data 133/233 can include (X,Y, Z) coordinate data 134, rotation data 135, and mouth control data 136. In such an implementation, (X,Y,Z) coordinate data 134 controls the position of digital puppet 218 in virtual space 217 being displayed on display 116/216. Rotation data 135 controls the orientation of digital puppet 218 in virtual space 217. For example, rotation data 135 might control digital puppet 218 to look left or right. Finally, mouth control data 136 controls the mouth of digital puppet 218 in virtual space 217. For example, mouth control data 136 might cause the mouth of digital puppet 218 to open or close. Furthermore, in one implementation, mouth control data 136 might include different opening degrees for the mouth of digital puppet 218. In such an implementation, mouth control data 136 might cause the mouth of digital puppet 218 to open just a little bit if user 170 barely opens his or her hand, or might cause the mouth of digital puppet 218 to open wide if user 170 fully opens his or her hand.

Flowchart 400 also includes animating the digital puppet on a display using the digital data and the audio data (460). For example, processor 115 might output digital data 133/233 to animate digital puppet 218 in virtual space 217 of display 116/216. Furthermore, in implementations where voice recognition 256 is being used, processor 115 might output voice command data 257 to further animate digital puppet 218 on display 116/216. Processor 115 also outputs audio data 155/255 using speaker 117, the audio being combined and synchronized with the animation of digital puppet 218 on display 116/216.

Moreover, besides just playing a digital puppet show on display 116/216, processor 115 might execute recorded video 290 in memory 120 of device 110/210 to record digital puppet 218 and create digital puppet show 295. User 170 is able then to playback digital puppet show 295 from the memory 120 of device 110/210 to show friends and family the 3-D animation user 170 created. This provides user 170 with the ability to easily produce 3-D animated puppet shows using a single device 110/210.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for animating a three-dimensional (3-D) digital puppet, the system comprising:
    a display;
    a microphone;
    a speaker;
    a camera; and
    a processor configured to:
        present the 3-D digital puppet to a user on the display;
        receive, using the camera, motion data corresponding to a gesture made by the user;
        receive, using the microphone, audio data corresponding to voice of the user for use in a 3-D digital puppet show;
        translate the motion data into digital data using a motion tracking algorithm, the digital data including at least (X,Y,Z) movement data;
        create the 3-D digital puppet show using the 3-D digital puppet by:
            animating the 3-D digital puppet, on the display, using the digital data;
            recording the audio data in real time and along with the animating of the 3-D digital puppet;
            searching the audio data for a command;
            playing, using the speaker, the audio data at the same time as the animating of the 3-D digital puppet on the display; and
            animating facial expressions of the 3-D digital puppet using the command at the same time as the animating the 3-D digital puppet on the display using the digital data translated from the motion data;
        wherein the audio data includes a plurality of time marks, and wherein playing the audio data includes synchronizing, using the plurality of time marks, the audio data with the animating of the 3-D digital puppet.

2. The system of claim 1, wherein before presenting the 3-D digital puppet to the user, the processor is further configured to:
    present a plurality of 3-D digital puppets to the user on the display; and
    receive a user input for selecting the 3-D digital puppet from the plurality of 3-D digital puppets.

3. The system of claim 1, wherein the gesture from the user is a hand gesture.

4. The system of claim 3, wherein a physical accessory corresponding to the 3-D digital puppet is used by the user for the hand gesture.

5. The system of claim 3, wherein a movement of fingers and a thumb of the hand gesture animates a mouth of the 3-D digital puppet.

6. The system of claim 1, wherein the digital data further includes rotational data.

7. The system of claim 1 further comprising a memory, wherein the motion tracking algorithm is stored in the memory.

8. The system of claim 1 further comprising a memory, wherein the processor is further configured to record the animation of the 3-D digital puppet in the memory to create the 3-D digital puppet show.

9. The system of claim 1, wherein the digital data further includes mouth control data.

10. A method for animating a 3-D digital puppet on a device including a processor, a display, a microphone, a speaker and a camera, the method comprising:
    presenting the 3-D digital puppet to a user on the display;
    receiving, using the camera, motion data corresponding to a gesture made by the user;
    receiving, using the microphone, audio data corresponding to voice of the user for use in a 3-D digital puppet show;
    translating the motion data into digital data using a motion tracking algorithm, the digital data including at least (X,Y,Z) movement data;
    creating a 3-D digital puppet show using the 3-D digital puppet by:
        animating the 3-D digital puppet, on the display, using the digital data;
        recording the audio data in real time and along with the animating of the 3-D digital puppet;

searching the audio data for a command;

playing, using the speaker, the audio data at the same time as the animating of the 3-D digital puppet on the display; and animating facial expressions of the 3-D digital puppet using the command at the same time as the animating the 3-D digital puppet on the display using the digital data translated from the motion data;

wherein the audio data includes a plurality of time marks, and wherein playing the audio data includes synchronizing, using the plurality of time marks, the audio data with the animating of the 3-D digital puppet.

11. The method of claim 10, wherein before presenting the 3-D digital puppet to the user, the method further comprises:

presenting a plurality of 3-D digital puppets to the user on the display; and receiving a user input for selecting the 3-D digital puppet from the plurality of 3-D digital puppets.

12. The method of claim 10, wherein the gesture from the user is a hand gesture.

13. The method of claim 12, wherein a physical accessory corresponding to the 3-D digital puppet is used by the user for the hand gesture.

14. The method of claim 12, wherein a movement of fingers and a thumb of the hand gesture animates a mouth of the 3-D digital puppet.

15. The method of claim 10, wherein the digital data further includes rotational data.

16. The method of claim 10, wherein the motion tracking algorithm is stored in a memory.

17. The method of claim 10, further comprising:

recording the animation of the 3-D digital puppet in a memory to create the 3-D digital puppet show.

18. The method of claim 10, wherein the digital data further includes mouth control data.

* * * * *